UNITED STATES PATENT OFFICE.

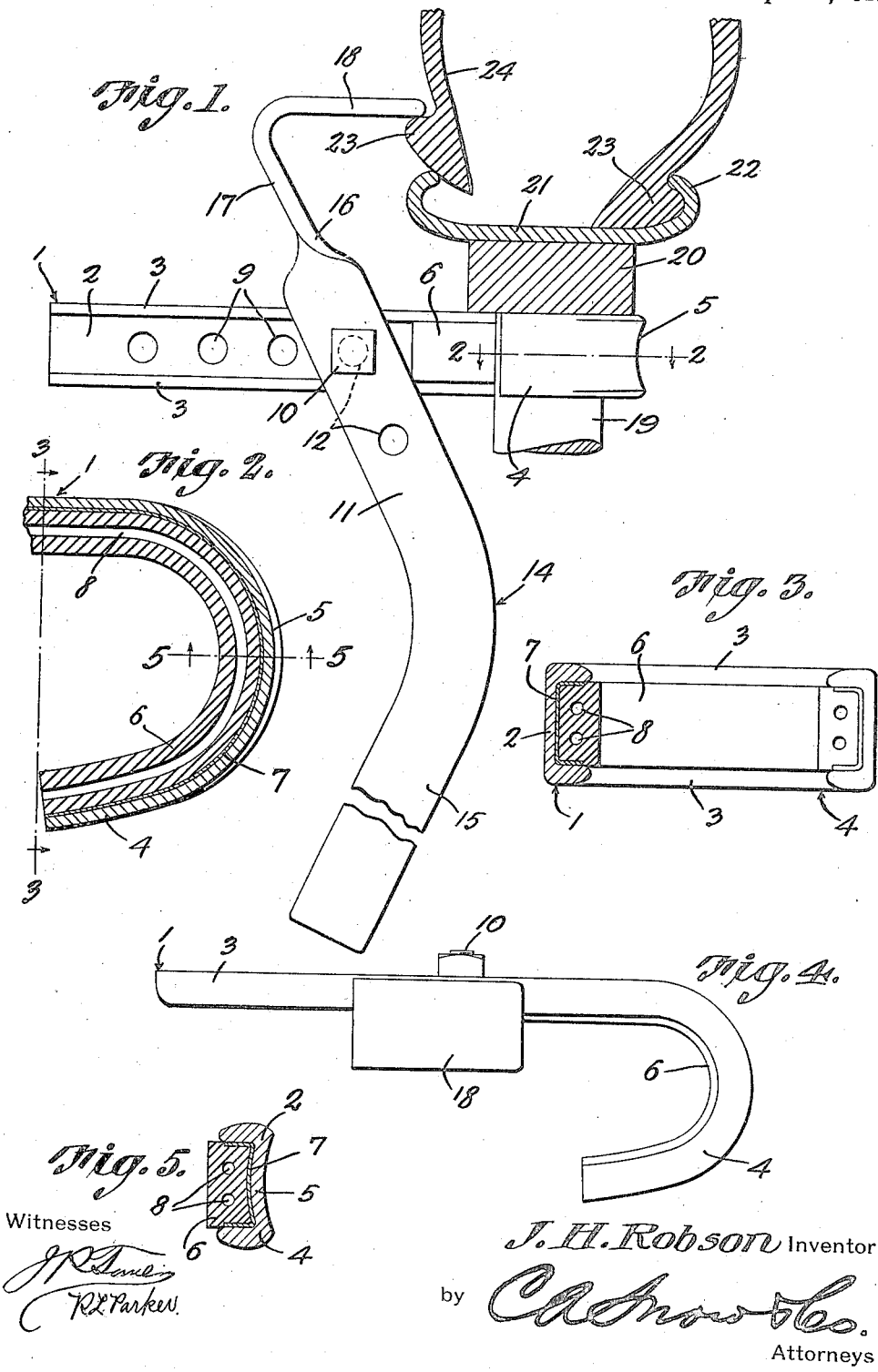

JAMES HERMAN ROBSON, OF COLUMBUS, MISSISSIPPI.

TIRE-TOOL.

1,301,746.   Specification of Letters Patent.   Patented Apr. 22, 1919.

Application filed November 7, 1916. Serial No. 130,032.

*To all whom it may concern:*

Be it known that I, JAMES H. ROBSON, a citizen of the United States, residing at Columbus, in the county of Lowndes and State of Mississippi, have invented a new and useful Tire-Tool, of which the following is a specification.

The device forming the subject matter of this application is adapted to be employed for manipulating a tire casing with respect to a vehicle rim. One object of the invention is to provide novel means whereby the supporting portion of the structure may be engaged with the spoke of a vehicle wheel, without marring the spoke.

Another object of the invention is to provide novel means whereby the hook portion of the main support will be reinforced against bending. It is a further object of the invention to provide, in a device of this type, a main support which will possess great strength.

A further object of the invention is to improve the construction of the lever which is pivoted to the main support.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a tire tool constructed in accordance with the present invention, the tire tool being assembled with a vehicle wheel and its tire, parts of the elements last above enumerated appearing in section;

Fig. 2 is a section taken approximately on the line 2—2 of Fig. 1;

Fig. 3 is a section taken approximately on the line 3—3 of Fig. 2;

Fig. 4 is a top plan of the tire tool; and Fig. 5 is a section taken approximately on the line 5—5 of Fig. 2.

The device forming the subject matter of this application preferably is made of metal throughout, saving as hereinafter specifically modified, and includes a main support 1 which, if desired, may be made out of a channel bar including a body 2 and flanges 3. The bar is bent so that at one end of the main lever 1, there exists a spoke engaging hook 4. The body portion 2 of the bar is bent, within the contour of the hook 4, transversely, as shown at 5, and this construction increases greatly the stiffness of the hook and enhances its strength, so that the hook is not likely to bend when engaged around a spoke, as hereinafter described. Disposed within the hook 4 is a resilient guard 6 which may be of any desired sort. In the present instance, the guard is in the form of a rubber strip attached to a canvas backing 7, the latter element being secured by cementing or otherwise within the contour of the hook 4. The guard lies between the flanges 3 in the hook portion of the device and is securely held in place. The guard 6 is provided with longitudinal openings 8 extending its full length. These openings enhance the resiliency of the guard. The bar out of which the support 1 is made is so bent that the flanges 3 project inwardly, and thus the part 1 is given great strength. In the handle portion of the member 1, openings 9 are formed. A pivot element 10 may be mounted for adjustment in any of the openings 9.

Disposed transversely of the main support 1 and mounted to swing on the pivot element 10 is a lever 11 having a plurality of openings 12, in any one of which the pivot element 10 may be mounted, for adjustment. The lever 11 preferably is made out of a flat rectangular bar of metal, curved as shown at 14, to form a rearwardly projecting handle 15. The handle 15 lies on one side of the support 1, and upon the other side of the support 1, the lever 11 is twisted as shown at 16 to form an arm 17 which is bent to form an angularly disposed lip 18, lying approximately parallel to the plane defined by the hook 4.

The numeral 19 designates the spokes of a wheel, carrying a felly 20 on which is mounted a rim 21 having clencher flanges 22 adapted to coöperate with clencher beads 23 on a tire casing 24.

In practical operation, the hook 4 of the support 1 is engaged around the spoke 19, and the guard 6 prevents the hook from marring the spoke. The lip 18 is engaged with one edge of the casing 24, and when the lever 11 is swung on the pivot element 10, the bead on the casing 24 may be made to engage with one of the clencher flanges of the rim.

Owing to the fact that the lever 11 is twisted as shown at 16, the lip 18 is presented in such a way to the casing 24 as to coöperate properly therewith.

The device forming the subject matter of this application is of few parts and simple in construction, but, owing to the particular configuration of the said parts, and owing to the nature of the stock out of which they are made, the device will have unusual strength and will be found to be peculiarly efficient for the ends in view.

Having thus described the invention, what is claimed is:—

A tire tool comprising a channel bar shaped to form a shank and a hook, the flanges of the bar extending around the inner curve of the hook, the body of the bar being concaved transversely, between the flanges and at the curve of the hook to stiffen the hook in combination with the flanges, the body of the shank having a plurality of openings, and the flanges extending along the shank to offset the weakness caused by the openings; a resilient guard extended along the inner curve of the hook and held between the flanges; a pivot element interchangeably mounted in the openings; and a lever fulcrumed on the pivot element in contact with the edges of the flanges, the lever having an angular lip overhanging the hook.

In testimony that I claim the foregoing as my own, I have hereto affixed my signature in the presence of two witnesses.

JAMES HERMAN ROBSON.

Witnesses:
  M. C. VANDIVER,
  FRANK C. OWEN.

Copies of this patent may be obtained for five cents each, by addressing the "Commissioner of Patents, Washington, D. C."